(12) United States Patent
Lee et al.

(10) Patent No.: US 10,397,863 B2
(45) Date of Patent: Aug. 27, 2019

(54) METHOD FOR ACTIVATING OR DEACTIVATING A CELL IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,743

(22) PCT Filed: Jul. 18, 2016

(86) PCT No.: PCT/KR2016/007794
§ 371 (c)(1),
(2) Date: Feb. 20, 2018

(87) PCT Pub. No.: WO2017/034156
PCT Pub. Date: Mar. 2, 2017

(65) Prior Publication Data
US 2018/0255512 A1   Sep. 6, 2018

Related U.S. Application Data

(60) Provisional application No. 62/208,000, filed on Aug. 21, 2015.

(51) Int. Cl.
*H04W 52/02* (2009.01)
*H04W 72/04* (2009.01)

(52) U.S. Cl.
CPC ... *H04W 52/0206* (2013.01); *H04W 52/0229* (2013.01); *H04W 72/042* (2013.01);
(Continued)

(58) Field of Classification Search
CPC ......... H04W 52/0206; H04W 52/0229; H04W 52/0235; Y02D 70/1262; Y02D 70/20;
(Continued)

(56) References Cited

U.S. PATENT DOCUMENTS

2011/0243106 A1* 10/2011 Hsu ................. H04L 5/0096
370/336
2013/0201834 A1* 8/2013 Klingenbrunn ....... H04W 28/12
370/236
(Continued)

FOREIGN PATENT DOCUMENTS

CN   101552727   10/2009
CN   102148670   8/2011
(Continued)

OTHER PUBLICATIONS

PCT International Application No. PCT/KR2016/007794, Notification of Transmittal of the International Search Report and the Written Opinion of the International Searching Authority, or Declaration dated Oct. 24, 2016, 10 pages.
(Continued)

*Primary Examiner* — Ajay Cattungal
(74) *Attorney, Agent, or Firm* — Lee Hong Degerman Kang Waimey

(57) ABSTRACT

The present invention relates to a wireless communication system. More specifically, the present invention relates to a method and a device for activating or deactivating a cell in a wireless communication system, the method comprising: receiving an A/D MAC CE on a specific cell among the plurality of cells, wherein all of values of Ci fields of the A/D MAC CE are set to a same value, and performing activation or deactivation of the specific cell according to the same value.

16 Claims, 12 Drawing Sheets

(52) U.S. Cl.
CPC ..... *H04W 52/0235* (2013.01); *Y02D 70/1224* (2018.01); *Y02D 70/1242* (2018.01); *Y02D 70/1262* (2018.01); *Y02D 70/1264* (2018.01); *Y02D 70/23* (2018.01); *Y02D 70/24* (2018.01)

(58) Field of Classification Search
CPC ........... Y02D 70/1242; Y02D 70/1224; Y02D 70/1264; Y02D 70/23
See application file for complete search history.

(56) References Cited

U.S. PATENT DOCUMENTS

| | | | | |
|---|---|---|---|---|
| 2014/0023010 | A1* | 1/2014 | Loehr | H04W 52/365 370/329 |
| 2015/0043489 | A1* | 2/2015 | Tseng | H04L 5/0098 370/329 |
| 2015/0103771 | A1 | 4/2015 | Kim et al. | |
| 2016/0204905 | A1* | 7/2016 | Lee | H04L 1/1812 370/329 |
| 2016/0212737 | A1* | 7/2016 | Jang | H04L 69/22 |
| 2016/0270019 | A1* | 9/2016 | Dinan | H04L 5/00 |
| 2016/0270064 | A1* | 9/2016 | Dinan | H04L 5/00 |
| 2016/0270071 | A1* | 9/2016 | Dinan | H04L 5/001 |
| 2016/0277162 | A1* | 9/2016 | Dinan | H04W 48/08 |
| 2016/0278083 | A1* | 9/2016 | Dinan | H04B 7/0626 |
| 2016/0309424 | A1* | 10/2016 | Dinan | H04W 52/365 |
| 2016/0309504 | A1* | 10/2016 | Dinan | H04W 74/002 |
| 2016/0352493 | A1* | 12/2016 | Tan Bergstrom | H04L 5/001 |
| 2018/0183560 | A1* | 6/2018 | He | H04L 5/001 |

FOREIGN PATENT DOCUMENTS

| | | |
|---|---|---|
| CN | 102624494 | 8/2012 |
| CN | 102668412 | 9/2012 |
| JP | 2012510207 | 4/2012 |
| JP | 2015029347 | 2/2015 |
| WO | 2014208732 | 2/2017 |

OTHER PUBLICATIONS

CATT, "Activation/Deactivation MAC CE of 32 CCs", 3GPP TSG RAN WG2 Meeting #90, R2-152278, May 2015, 3 pages.

XINWEI, "Combination solution for A/D MAC CE with up to 32 CCs", 3GPP TSG RAN WG2 Meeting #91, R2-153577, Aug. 2015, 4 pages.

ITL, "Remaining issues on Activation/Deactivation MAC CE for b5C", 3GPP TSG RAN WG2 Meeting #91, R2-153324, Aug. 2015, 3 pages.

3rd Generation Partnership Project (3GPP), "Technical Specification Group Radio Access Network; Evolved Universal Terrestrial Radio Access (E-UTRA); Medium Access Control (MAC) protocol specification (Release 12)," 3GPP TS 36.321 V12.6.0, Jun. 2015, 77 pages.

European Patent Office Application Serial No. 16839446.8, Search Report dated Jan. 15, 2019, 9 pages.

Panasonic, "Open issues on component carrier activation and deactivation", 3GPP TSG RAN WG2 Meeting #69, R2-101082, Feb. 2010, 4 pages.

Samsung, "New format for Activation/Deactivation MAC Control Element", 3GPP TSG RAN WG2 Meeting #90, R2-152710, May 2015, 2 pages.

Ericsson, et al., "Summary of the email discussion [68#23] LTE: CC activation / deactivation" 3GPP TSG RAN WG2 Meeting #68bis, R2-100079, Jan. 2010, 17 pages.

Brand, A. et al., "Multiple Access Protocols for Mobile Communications: GPRS, UMTS and Beyond," John Wiley & Sons Ltd., May 2015, XP055538764, 468 pages.

* cited by examiner (a) Control-Plane Protocol Stack (b) User-Plane Protocol Stack R/R/E/LCID sub-header

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

METHOD FOR ACTIVATING OR DEACTIVATING A CELL IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2016/007794, filed on Jul. 18, 2016, which claims the benefit of U.S. Provisional Application No. 62/208,000, filed on Aug. 21, 2015, the contents of which are all hereby incorporated by reference herein in its entirety.

TECHNICAL FIELD

The present invention relates to a wireless communication system and, more particularly, to a method for activating or deactivating a cell in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for activating or deactivating a cell in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

For reducing signaling overhead regarding activation or deactivation of a cell, it is invented that a UE activates or deactivates a cell if the UE receives an A/D MAC CE on the cell. When the UE receives the A/D MAC CE on the cell, the UE activates or deactivates the cell on which the UE receives the A/D MAC CE depending on values of Ci fields of the received A/D MAC CE.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (HDD) scheme in the present specification, the embodiments of the present invention may be easily modified and applied to a half-duplex FDD (H-FDD) scheme or a time division duplex (TDD) scheme.

Figure 1:
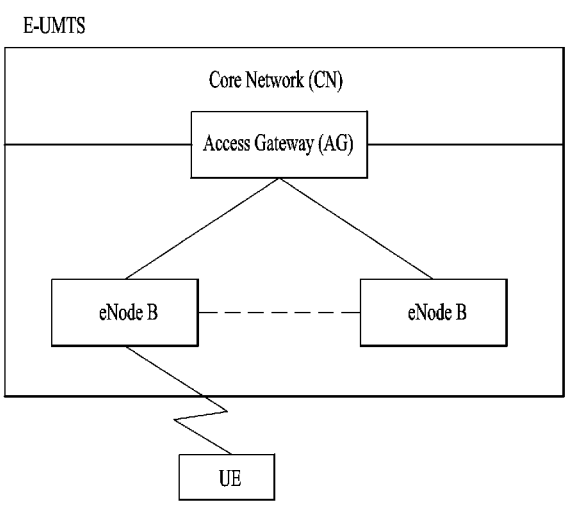
FIG. 1 is a diagram showing a network structure of an Evolved Universal Mobile Telecommunications System (E-UMTS) as an example of a wireless communication system.
Figure 2A:
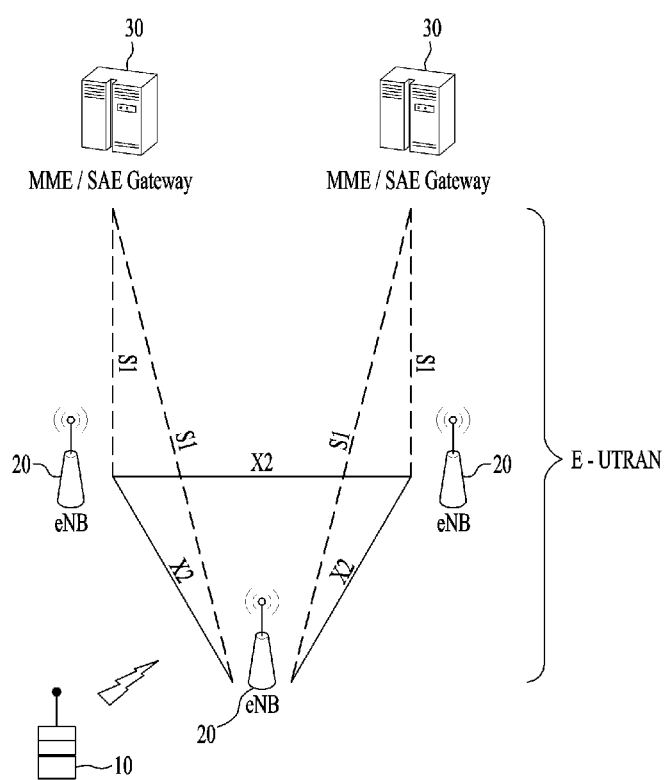
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
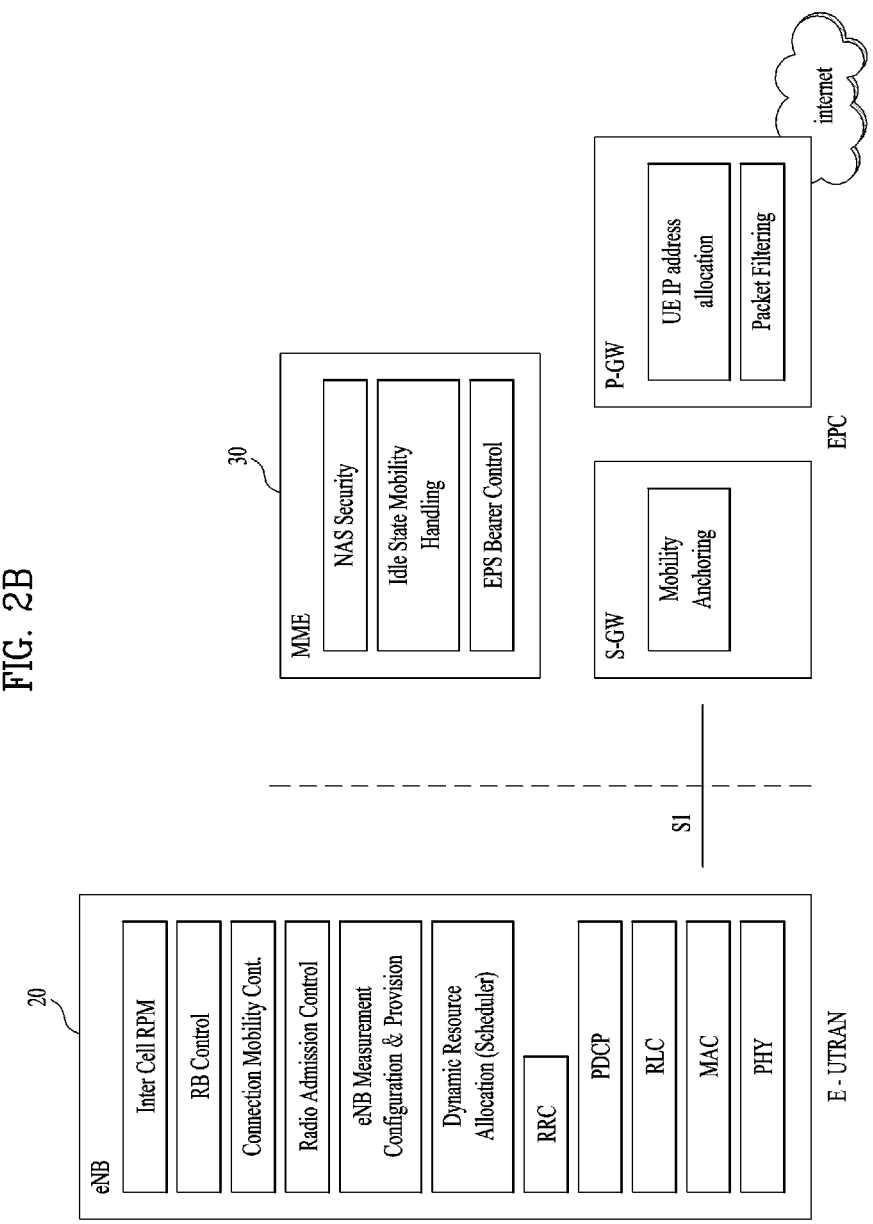
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
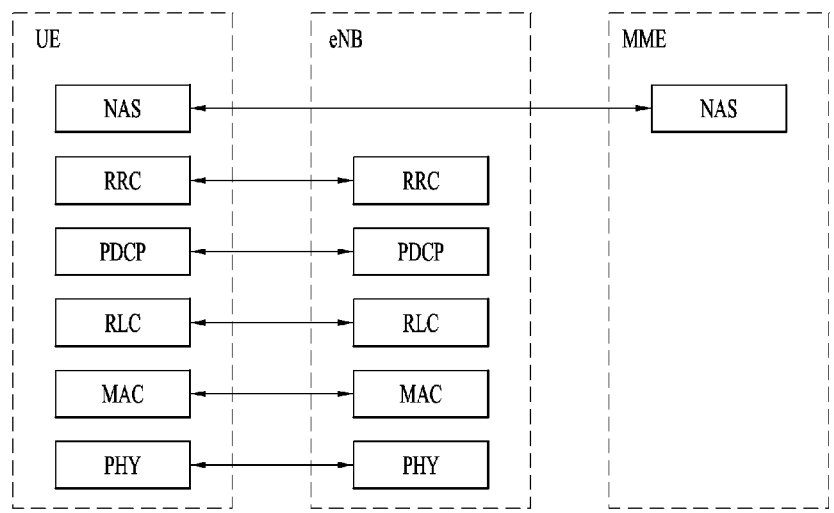
FIG. 3 is a diagram showing a control plane and a user plane of a radio interface protocol between a UE and an E-UTRAN based on a 3rd generation partnership project (3GPP) radio access network standard.
Figure 3:
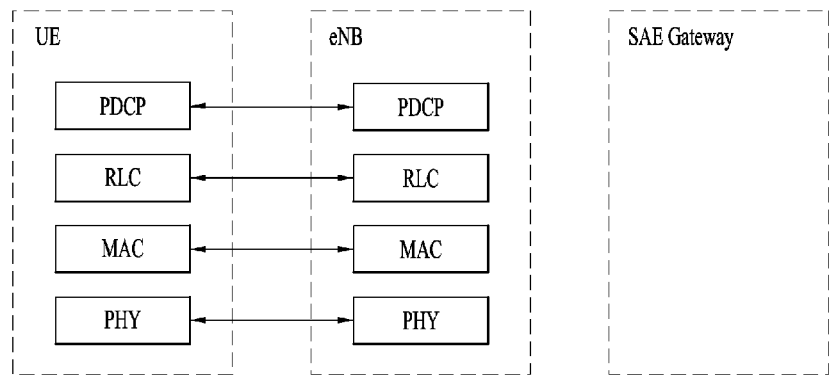

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
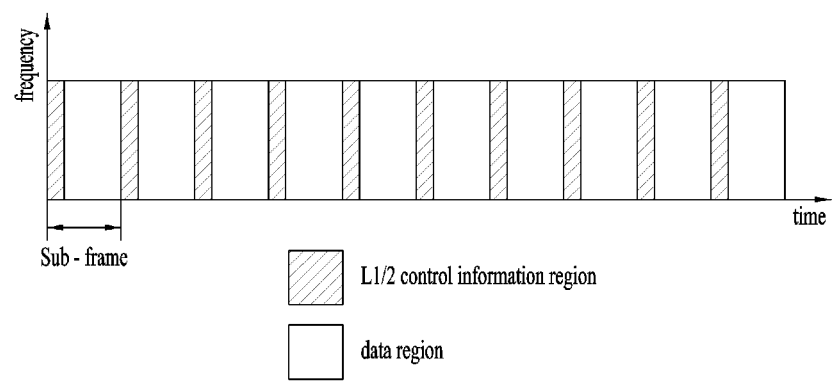
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
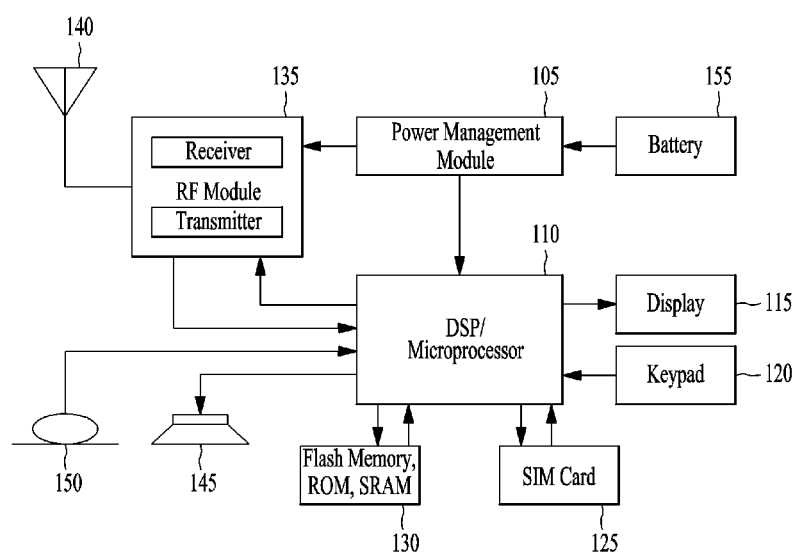
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
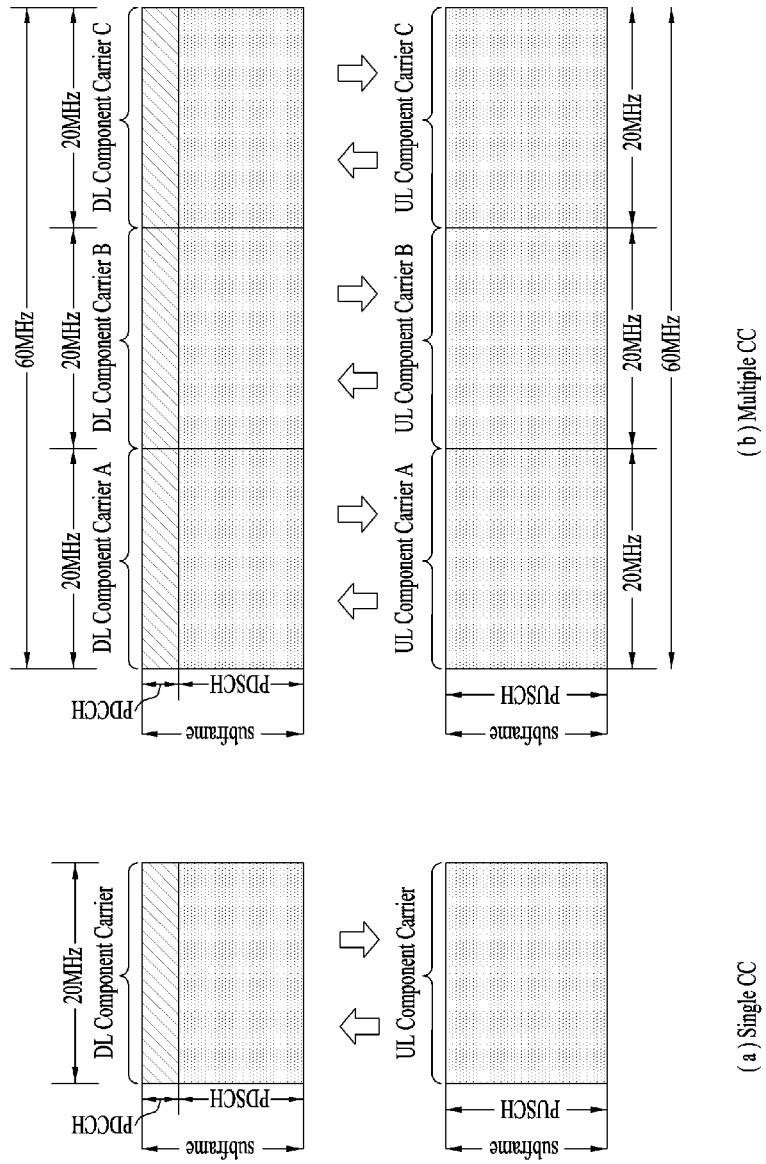
FIG. 6 illustrates an example of CCs and CA in the LTE-A system, which are used in embodiments of the present disclosure.

FIG. 6 illustrates an example of CCs and CA in the LTE-A system, which are used in embodiments of the present disclosure.

A 3GPP LTE system (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and a SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of a SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

A SCell may refer to a cell operating in a secondary frequency (or a secondary CC). Although only one PCell is allocated to a specific UE, one or more SCells may be allocated to the UE. A SCell may be configured after RRC connection establishment and may be used to provide additional radio resources. There is no PUCCH in cells other than a PCell, that is, in SCells among serving cells configured in the CA environment.

When the E-UTRAN adds a SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and a SCell may operate as a CC. Hereinbelow, a Primary CC (PCC) and a PCell may be used in the same meaning and a Secondary CC (SCC) and an SCell may be used in the same meaning in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

Figure 7:
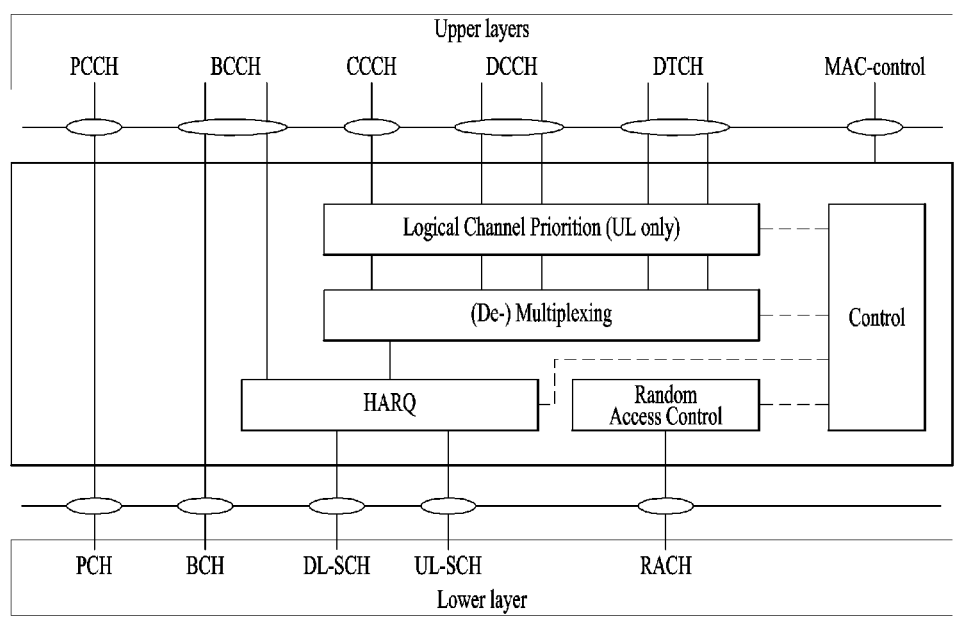
FIG. 7 is a diagram for MAC structure overview in a UE side.

FIG. 7 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

Meanwhile, if a MAC entity is configured with one or more SCells, the network may activate and deactivate the configured SCells. The SpCell is always activated. The network activates and deactivates the SCell(s) by sending the Activation/Deactivation MAC control element (CE). Furthermore, the MAC entity maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover. The configured SCG SCells are initially deactivated after a SCG change.

For each TTI and for each configured SCell, if the MAC entity receives an Activation/Deactivation MAC control element in this TTI activating the SCell, the MAC entity shall activate the SCell (i.e., apply normal SCell operation including SRS transmissions on the SCell, CQI/PMI/RI/PTI reporting for the SCell, PDCCH monitoring on the SCell, PDCCH monitoring for the SCell), start or restart the sCellDeactivationTimer associated with the SCell, trigger Power Headroom Report (PHR) in the TTI.

Else, if the MAC entity receives an Activation/Deactivation MAC control element in this TTI deactivating the SCell or if the sCellDeactivationTimer associated with the activated SCell expires in this TTI, for each TTI and for each configured SCell, the MAC entity shall deactivate the SCell, stop the sCellDeactivationTimer associated with the SCell, flush all HARQ buffers associated with the SCell in the TTI.

For each TTI and for each configured SCell, if PDCCH on the activated SCell indicates an uplink grant or downlink assignment or if PDCCH on the Serving Cell scheduling the activated SCell indicates an uplink grant or a downlink assignment for the activated SCell, the MAC entity shall restart the sCellDeactivationTimer associated with the SCell.

For each TTI and for each configured SCell, if the SCell is deactivated, the MAC entity shall not transmit SRS on the SCell, not report CQI/PMI/RI/PTI for the SCell, not transmit on UL-SCH on the SCell, not transmit on RACH on the SCell, not monitor the PDCCH on the SCell, not monitor the PDCCH for the SCell.

HARQ feedback for the MAC PDU containing Activation/Deactivation MAC control element shall not be impacted by PCell interruption due to SCell activation/deactivation.

It is noted that when SCell is deactivated, the ongoing Random Access procedure on the SCell, if any, is aborted.

Figure 8:
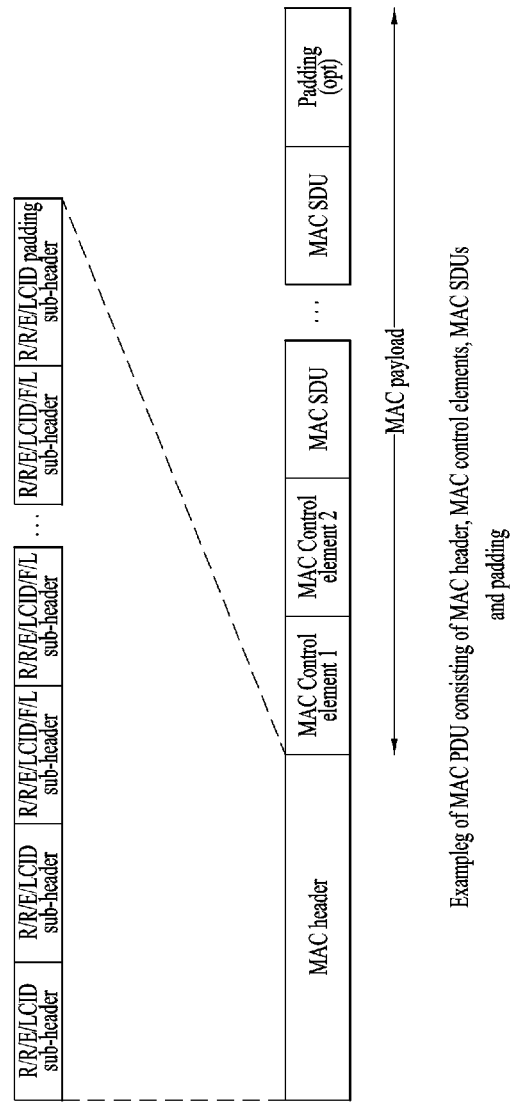
FIG. 8 is a diagram for MAC PDU consisting of MAC header, MAC control elements, MAC SDUs and padding.

FIG. 8 is a diagram for MAC PDU consisting of MAC header, MAC control elements, MAC SDUs and padding.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG. 8, is used.

To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information. Furthermore, the length field in the sub-header is removed for control elements with a fixed length.

A MAC PDU header consists of one or more MAC PDU subheaders; each subheader corresponds to either a MAC SDU, a MAC control element or padding.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per UE. A maximum of one MCH MAC PDU can be transmitted per TTI.

Figure 9A:
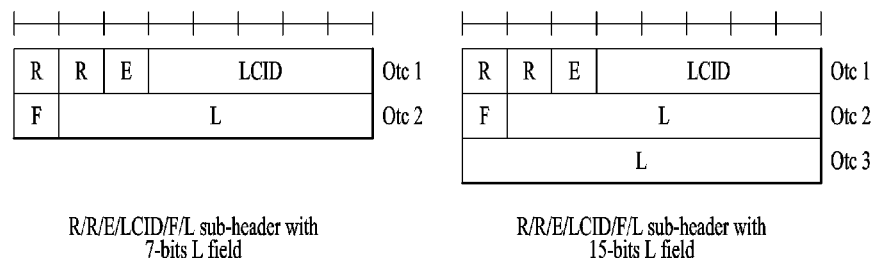
FIGS. 9A and 9B are examples for MAC PDU subheader structures.
Figure 9B:
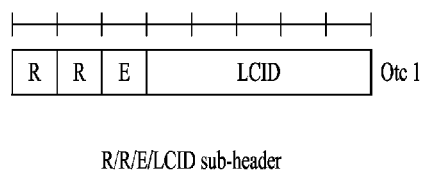

FIGS. 9A and 9B are examples for MAC PDU subheader structures.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

The MAC header is of variable size and consists of the following fields:

1) LCID: The Logical Channel ID field identifies the logical channel instance of the corresponding MAC SDU or the type of the corresponding MAC control element or padding as described in Tables 1, 2 and 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 shall indicate CCCH using LCID "01011", otherwise the UE shall indicate CCCH using LCID "00000". The LCID field size is 5 bits.

TABLE 1

Values of LCID for DL-SCH

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
|---|---|
| 00000 | CCCH |
| 00001-01010 | Identity of the logical channel |
| 01011 | CCCH |
| 01100-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |

TABLE 2-continued

Values of LCID for UL-SCH

| Index | LCID values |
|---|---|
| 11110 | Long BSR |
| 11111 | Padding |

TABLE 3

Values of LCID for MCH

| Index | LCID values |
|---|---|
| 00000 | MCCH (see note) |
| 00001-11100 | MTCH |
| 11101 | Reserved |
| 11110 | MCH Scheduling Information or Extended MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
|---|---|
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

Figure 10:
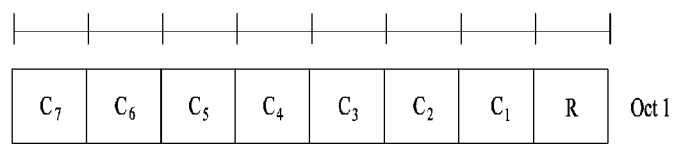
FIG. 10 is example for Activation/Deactivation MAC control element in a carrier aggregation system.

FIG. 10 is example for Activation/Deactivation MAC control element in a carrier aggregation system.

The MAC control Element includes control information for a MAC behavior. There are Buffer Status Report MAC Control Element, C-RNTI MAC Control Element, DRX Command MAC Control Element, UE Contention Resolution Identity MAC Control Element, Timing Advance Command MAC Control Element, Power Headroom Report MAC Control Element, MCH Scheduling Information MAC Control Element, and Activation/Deactivation MAC Control Elements.

For activating/deactivating SCells, the Activation/Deactivation MAC control element of one octet is identified by a MAC PDU subheader with LCID as specified in Table 1. It has a fixed size and consists of a single octet containing seven C-fields and one R-field. The Activation/Deactivation MAC control element with one octet is defined as FIG. 10.

A "Ci field" indicates the activation/deactivation status of the SCell with SCellIndex if there is a SCell configured with SCellIndex i. Else the MAC entity shall ignore the Ci field. The Ci field is set to "1" to indicate that the SCell with SCellIndex i shall be activated. The Ci field is set to "0" to indicate that the SCell with SCellIndex i shall be deactivated.

Up to Rel-12, up to 5 cells can be configured to the UE. However, in Rel-13 CA enhancements, aggregating up to 32 CCs is supported. It means that the maximum serving cells of 32 can be configured. If the Activation/Deactivation MAC CE in FIG. 10 is re-used by same mechanism, at maximum 7 SCells can be activated or deactivated simultaneously and the SCells expressed by SCellIndex of more than 7 cannot be indicated with the legacy format. That is, for CA up to 32 CCs, the serving cell indexing value become insufficient.

Figures 11, 12:
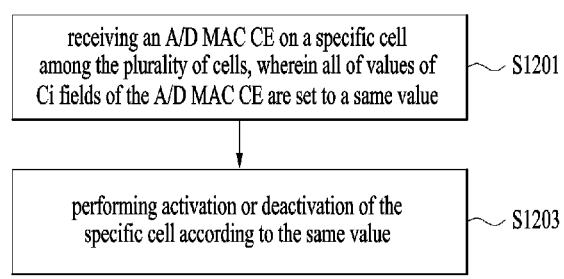
FIG. 11 shows an exemplary format for Activation/Deactivation MAC control element for CA up to 32 CCs.
FIG. 12 is conceptual diagram for a UE operation regarding Activation/Deactivation of SCells according to an exemplary embodiment of the present invention.

Meanwhile, for CA up to 32 CCs, a format for Activation/Deactivation MAC CE is introduced, as shown in FIG. 11.

FIG. 11 shows an exemplary format for Activation/Deactivation MAC control element for CA up to 32 CCs.

Referring to FIG. 11, size of A/D MAC CE increases by 4 bytes for support up to 32 CCs. This is a most straightforward option, which extends the range of SCellIndex and ServCellIndex values in accordance with the increased CC numbers (i.e. 32).

It is simple approach but adding more bits in a A/D MAC CE to extend cell index should increase signaling overhead. More specifically, given that each SCell is activated/deactivated independently, it would increase signaling overhead if the A/D MAC CE in FIG. 11 is transmitted in order to activate/deactivate only a few of SCells. Thus, it needs to develop a mechanism to activate/deactivate a SCell by considering the signaling overhead.

In the present invention, for reducing signaling overhead described above, it is invented that a UE activates or deactivates a cell if the UE receives an A/D MAC CE on the cell. When the UE receives the A/D MAC CE on the cell, the UE activates or deactivates the cell on which the UE receives the A/D MAC CE depending on values of Ci fields of the received A/D MAC CE. More specific examples will be described in FIGS. 12 to 14.

FIG. 12 is conceptual diagram for a UE operation regarding Activation/Deactivation of SCells according to an exemplary embodiment of the present invention.

In the present exemplary embodiment, it is assumed that a UE is configured with at least one SCell by an eNB.

A UE can be configured by an eNB to activate or deactivate a cell on which the UE receives an A/D MAC CE, when i) the UE receives an RRC signal from the eNB including an indication indicating that the UE activates or deactivates a cell on which the UE receives an A/D MAC CE, ii) the UE is configured with equal to or more than a certain number of carriers (e.g., the certain number is 7), iii) the UE is configured with a cell of which cell index (e.g., SCellIndex) is equal to or larger than a certain value (e.g., the certain value is 8), or iv) the highest cell index among a cell indices (e.g., SCellIndex) of the cells configured for the UE is equal to or larger than a certain value (e.g., the certain value is 8).

Meanwhile, if an eNB decides to activate or deactivate a cell which is configured for a UE, the eNB transmits an A/D MAC CE by setting the Ci fields of the A/D MAC CE. More specifically, if the eNB decides to activate the cell, the eNB sets Ci fields of the A/D MAC CE to value 'X (e.g., X is 1)'.

Or, if the eNB decides to deactivate the cell, the eNB sets Ci fields of the A/D MAC CE to value 'Y (e.g., Y is 0)'.

Preferably, for the MAC subheader corresponding to the MAC PDU including the A/D MAC CE, the eNB sets the LCID field to 11011 (i.e., which is LCID value of Activation/Deactivation MAC CE as shown in Table 1), or a new value (e.g., 01011, which is currently a reserved value as shown in Table 1).

If the UE is configured by the eNB to activate or deactivate the cell on which the UE receives the A/D MAC CE, the UE may perform as follows.

Firstly, when the UE receives the A/D MAC CE from the eNB, the UE checks on which cell the A/D MAC CE is received. If the UE receives a PDCCH which indicates a transmission on the cell and if the A/D MAC CE is included in a MAC PDU indicated by the PDCCH, the UE considers that A/D MAC CE is received on the cell. The PDCCH which indicates a transmission on the cell can be received on a cell on which the A/D MAC CE is received, or a cell which is configured for the UE and is a scheduling cell of the cell on which the A/D MAC CE is received.

The UE checks the Ci fields of the received A/D MAC CE. If the Ci fields of the received A/D MAC CE are 'X (e.g., X is 1)', the UE activates the cell on which the UE received the A/D MAC CE. Else if the Ci fields of the received A/D MAC CE are 'Y (e.g., Y is 0)', the UE deactivates the cell on which the UE received the A/D MAC CE.

Referring to FIG. 12, a UE receives an A/D MAC CE on a specific cell among the plurality of cells (S1201). Here, all of values of Ci fields of the A/D MAC CE may be set to a same value. For example, all of values of the Ci fields may be set to "1" or "0".

The UE considers that the A/D MAC CE is received on the specific cell, if the UE receives a physical downlink control channel (PDCCH) which indicates that a MAC PDU is transmitted on the specific cell and the A/D MAC CE is included in the MAC PDU.

In some embodiments, a cell on which the UE receives the PDCCH may be same as the specific cell, or another cell which is for scheduling the specific cell among the plurality of cells.

The UE performs activation or deactivation of the specific cell according to the same value (S1203). For example, the UE may activate the specific cell if the same value is '1'. Or, the UE may deactivate the specific cell if the same value is '0'.

Preferably, the UE performs activation or deactivation of the specific cell according to the same value, i) if the UE receives an indication indicating that the UE activates or deactivates a cell on which the A/D MAC CE is received, ii) if a number of the plurality of cells is equal to or more than a certain value (e.g., 7), iii) if the plurality of cells include a cell whose cell index is equal to or larger than a certain value (e.g., 8), or iv) if a highest cell index among cell indices of the plurality of cells is equal to or larger than the certain value (e.g., 8).

More specific examples will be described in FIGS. 13 and 14.

Figure 13:
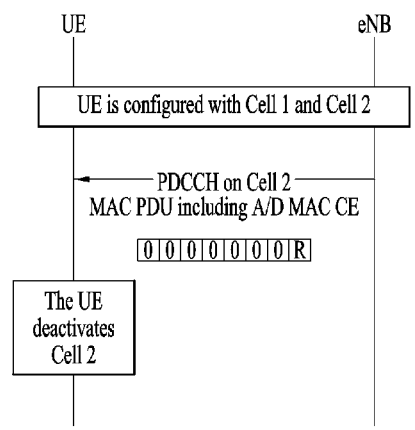
FIG. 13 shows an example of a UE operation regarding Activation/Deactivation of SCells according to an exemplary embodiment of the present invention.

FIG. 13 shows an example of a UE operation regarding Activation/Deactivation of SCells according to an exemplary embodiment of the present invention.

In FIG. 13, it is assumed that Cell 1 and Cell 2 are configured for a UE. Here, Cell 1 and Cell 2 are self scheduling cells (i.e., non-cross-scheduling cell). That is, the UE receives PDCCH on each cell for transmission of MAC PDU on each cell, respectively. It is also assumed that value '1' of Ci field is for activating, and value '0' of the Ci field is for deactivating.

Referring to FIG. 13, the UE is configured with Cell 1 and Cell 2, and the UE receives a PDCCH on Cell 2. The PDCCH on Cell 2 indicates a transmission on Cell 2. In other words, The PDCCH indicates that a MAC PDU is to be transmitted by the eNB on the Cell 2. The UE receives the MAC PDU on Cell2. The MAC PDU indicated by the PDCCH may include an A/D MAC CE. In the present exemplary embodiment, Ci fields of the received A/D MAC CE are set to '0'. As the UE receives the A/D MAC CE on Cell 2, and the Ci fields are set to '0', the UE deactivates the Cell 2.

Figure 14:
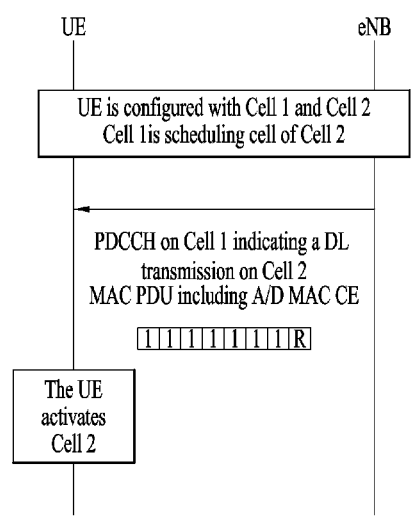
FIG. 14 shows another example of a UE operation regarding Activation/Deactivation of SCells according to an exemplary embodiment of the present invention.

FIG. 14 shows another example of a UE operation regarding Activation/Deactivation of SCells according to an exemplary embodiment of the present invention.

In FIG. 14, it is assumed that Cell 1 and Cell 2 are configured for a UE. Here, Cell 1 is a cross-scheduling cell of Cell 2. That is, the UE receives a PDCCH, which is for transmission on Cell 2, on Cell 1. It is also assumed that value '1' of Ci field is for activating, and value '0' of the Ci field is for deactivating.

Referring to FIG. 14, the UE receives PDCCH on Cell 1. Because the PDCCH is a cross-scheduling cell of Cell 2, the PDCCH on Cell 1 indicates that data is transmitted on Cell 2. A MAC PDU indicated by the PDCCH includes an A/D MAC CE. In this case, the UE may consider that an A/D MAC CE is received on Cell 2.

In the present exemplary embodiment, Ci fields of the received A/D MAC CE are set to '1'. As the UE receives the A/D MAC CE on Cell 2, and the Ci fields are set to '1', the UE activates the Cell 2.

In summary, in order to activate/deactivate up to 32 cells, all of values of Ci fields of an A/D MAC CE are set to a same value, and the UE performs activation or deactivation of a specific cell on which the UE receives the A/D MAC CE according to the same value. Thus, according to the present invention, signaling overhead for activating/deactivating a cell can be reduced.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) configured with a plurality of cells operating in a wireless communication system, the method comprising:
    receiving an activation/deactivation (A/D) medium access control (MAC) control element (CE) on a specific cell among the plurality of cells, wherein all of values of Ci fields of the A/D MAC CE are set to a same value; and
    performing activation or deactivation of the specific cell according to the same value.

2. The method according to claim 1,
    wherein the UE activates the specific cell if the same value is '1', or deactivates the specific cell if the same value is '0'.

3. The method according to claim 1,
    wherein the UE considers that the A/D MAC CE is received on the specific cell, if the UE receives a physical downlink control channel (PDCCH) which indicates that a MAC protocol data unit (PDU) is transmitted on the specific cell and the A/D MAC CE is included in the MAC PDU.

4. The method according to claim 3,
    wherein a cell on which the UE receives the PDCCH is same as the specific cell, or another cell which is for scheduling the specific cell among the plurality of cells.

5. The method according to claim 1,
    wherein the UE performs activation or deactivation of the specific cell according to the same value, if the UE receives an indication indicating that the UE activates or deactivates a cell on which the A/D MAC CE is received.

6. The method according to claim 1,
wherein the UE performs activation or deactivation of the specific cell according to the same value, if a number of the plurality of cells is equal to or more than a certain value.

7. The method according to claim 1,
wherein the UE performs activation or deactivation of the specific cell according to the same value, if the plurality of cells include a cell whose cell index is equal to or larger than a certain value.

8. The method according to claim 1,
wherein the UE performs activation or deactivation of the specific cell according to the same value, if a highest cell index among cell indices of the plurality of cells is equal to or larger than a certain value.

9. A User Equipment (UE) for operating in a wireless communication system, the UE comprising:
a Radio Frequency (RF) module; and
a processor operably coupled with the RF module and configured to:
receive an activation/deactivation (A/D) medium access control (MAC) control element (CE) on a specific cell among the plurality of cells, wherein all of values of Ci fields of the A/D MAC CE are set to a same value; and
perform activation or deactivation of the specific cell according to the same value.

10. The UE according to claim 9,
wherein the UE activates the specific cell if the same value is '1', or deactivates the specific cell if the same value is '0'.

11. The UE according to claim 9,
wherein the UE considers that the A/D MAC CE is received on the specific cell, if the UE receives a physical downlink control channel (PDCCH) which indicates that a MAC protocol data unit (PDU) is transmitted on the specific cell and the A/D MAC CE is included in the MAC PDU.

12. The UE according to claim 11,
wherein a cell on which the UE receives the PDCCH is same as the specific cell, or another cell which is for scheduling the specific cell among the plurality of cells.

13. The UE according to claim 9,
wherein the UE performs activation or deactivation of the specific cell according to the same value, if the UE receives an indication indicating that the UE activates or deactivates a cell on which the A/D MAC CE is received.

14. The UE according to claim 9,
wherein the UE performs activation or deactivation of the specific cell according to the same value, if a number of the plurality of cells is equal to or more than a certain value.

15. The UE according to claim 9,
wherein the UE performs activation or deactivation of the specific cell according to the same value, if the plurality of cells include a cell whose cell index is equal to or larger than a certain value.

16. The UE according to claim 9,
wherein the UE performs activation or deactivation of the specific cell according to the same value, if a highest cell index among cell indices of the plurality of cells is equal to or larger than a certain value.

* * * * *